US006941489B2

(12) United States Patent
DeLano

(10) Patent No.: US 6,941,489 B2
(45) Date of Patent: Sep. 6, 2005

(54) CHECKPOINTING OF REGISTER FILE

(75) Inventor: Eric DeLano, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 474 days.

(21) Appl. No.: 10/084,533

(22) Filed: Feb. 27, 2002

(65) Prior Publication Data

US 2003/0163763 A1 Aug. 28, 2003

(51) Int. Cl.[7] .................................................. G06F 11/00
(52) U.S. Cl. ........................................... 714/10; 714/15
(58) Field of Search ............................. 714/10, 15, 19, 714/21

(56) References Cited

U.S. PATENT DOCUMENTS 3,736,566 A * 5/1973 Anderson et al. ............. 714/15
5,119,483 A * 6/1992 Madden et al. ............... 714/15
5,269,017 A * 12/1993 Hayden et al. ............... 714/15
5,568,380 A * 10/1996 Brodnax et al. .............. 700/79
5,692,121 A * 11/1997 Bozso et al. .................. 714/13
6,629,271 B1 * 9/2003 Lee et al. ..................... 714/49

* cited by examiner

*Primary Examiner*—Robert Beausoliel
*Assistant Examiner*—Gabriel L. Chu

(57) ABSTRACT

The invention performs an extra read from a register of a register file prior to writing to that register. The data from the extra read is stored in a buffer (e.g., another register file). After a "checkpoint" period, a check is made as to whether any data errors have occurred; if there are no errors, the buffer is flushed and processing continues per normal; if there are errors, the register file is rewritten with contents from the buffer and the program counter is reset to the prior checkpoint, wherein after processing re-executes program instructions from the last checkpoint. The checkpointing period may be defined by the memory size of the buffer; typically that buffer has a fraction of the memory capacity of the register file, since a flush occurs at every checkpoint. The register file of the invention may utilize an extra read port with the register file to perform the extra read. The extra read may occur for every write to the register file; alternatively, the extra read may occur for a subset of the writes to the register file.

20 Claims, 3 Drawing Sheets

CHECKPOINTING OF REGISTER FILE

BACKGROUND OF THE INVENTION

Modern computing systems utilize various hardware and software techniques to detect internal data errors. One such technique used within RAID I/O devices includes multiple redundant central processing units (CPUs) to duplicate processing. The results are compared and, if identical, a decision is made as to whether the data is error-free. If errors are detected, a decision is made as to which of the redundant devices is correct.

In RISC processors, redundant processing cores are sometimes implemented on a common die to similarly provide redundant error checking techniques. Redundancy may also be duplicated at lower level devices (e.g., an ALU) to provide like error-detect capabilities for parity level decisions. RISC processors also sometimes implement error correction code such as in connection with cache entries. However, data errors within the random and speculative logic of RISC processors are particularly difficult to detect; and there are no practical error correction techniques suitable for operations such as prefetch, branch prediction and bypassing.

There may be many causes of data errors within RISC processors. By way of example, cosmic ray particles may flip a bit within a logical latch of the processor. Dynamic logic and storage nodes are particularly susceptible to cosmic and alpha particles that perturb internal storage cells. Even static logic devices (e.g., NOR gates) may exhibit error or noise due to cosmic particles.

Accordingly, prior art techniques exist that may "detect" logical errors and the like within RISC processors. Nevertheless, redundant detection techniques often complicate timing and bypass logic; it may for example take up to three extra cycles to perform a compare between redundant devices, which greatly complicates the write-back logic of parallel pipelines.

Moreover, within the prior art, the "recovery" associated with data errors is quite difficult and cumbersome. Often, for example, this recovery involves analyzing and electing which of two redundant devices to use as the appropriate data. The prior art has even implemented three redundant devices to help this analysis and election. Improvements are thus needed to facilitate data recovery in the event of logical errors in modem processors. One feature of the invention is to provide recovery logic within the RISC processor to recapture lost or corrupted data written to register files. Other features of the invention are apparent within the description that follows.

SUMMARY OF THE INVENTION

The invention in one aspect includes methodology to perform an extra read from a register file prior to writing to that register file. The data from the extra read is stored in a buffer (e.g., another register file). After a time period—defined herein as a "checkpoint"—a check is made as to whether any data errors have occurred; if there are no errors, the buffer is flushed and processing continues per normal; if there are errors, the register file is rewritten with contents from the buffer and the program counter is reset to the prior checkpoint, wherein after processing re-executes program instructions from the last checkpoint. Checkpointing of the register file may occur at predetermined time periods, e.g., every 100 cycles. The checkpointing period may be defined by the memory size of the buffer; typically that buffer has a fraction of the memory capacity of the register file, since a flush occurs at every checkpoint. By way of example, the buffer may include twenty registers as compared to one hundred twenty eight registers in the register file. The register file of the invention may utilize an extra read port with the register file to perform the extra read. In accord with certain aspects, the invention may perform the extra read for every write to the register file; alternatively, the invention may perform the extra read for a subset of the writes to the register file.

The invention thus protects the processor from inadvertent data errors, such as a corrupted speculative write to the register file. At the end of each pipeline, often identified by those skilled in the art as the "write-back" stage, the register file is architected; any delay in the write-back stage increases the b ass logic. Accordingly, the invention preferably architects the register file in norm write-back operations; but a backup copy of the affected register is made within the buffer in case of data errors. In one aspect, checkpointing occurs after each fixed number of cycles; a larger buffer increases the time slice available for recovery d between checkpoints. Prior to each register write, the prior value is read and stored within the buffer. At each checkpoint, therefore, the older data may be rewritten t the register file so that the program may return to a prior checkpoint location e.g., via the program counter) to re-execute the instructions. The invention thus circumvents errors caused by random cosmic rays or alpha particles within processor logic.

In yet another aspect, the invention circumvents additional bypass logic which might otherwise be required, due to the extra read, by reading the register file at the same time instruction operands are read during pipeline execution of instructions; bypass logic already exists within certain RISC processors to accomplish this. Accordingly, the extra read of the invention may be accomplished just prior to the execution stage of the pipeline since the register implicated by the instruction has just been identified.

In still another aspect, the invention utilizes its existing write port to recover data from the buffer to the register file; in another aspect, an additional register file write port is utilized. Preferably, the register file has an additional read port to perform the extra read.

Preferably, error correction code is used in connection with the buffer.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF THE DRAWINGS

Figure 1:
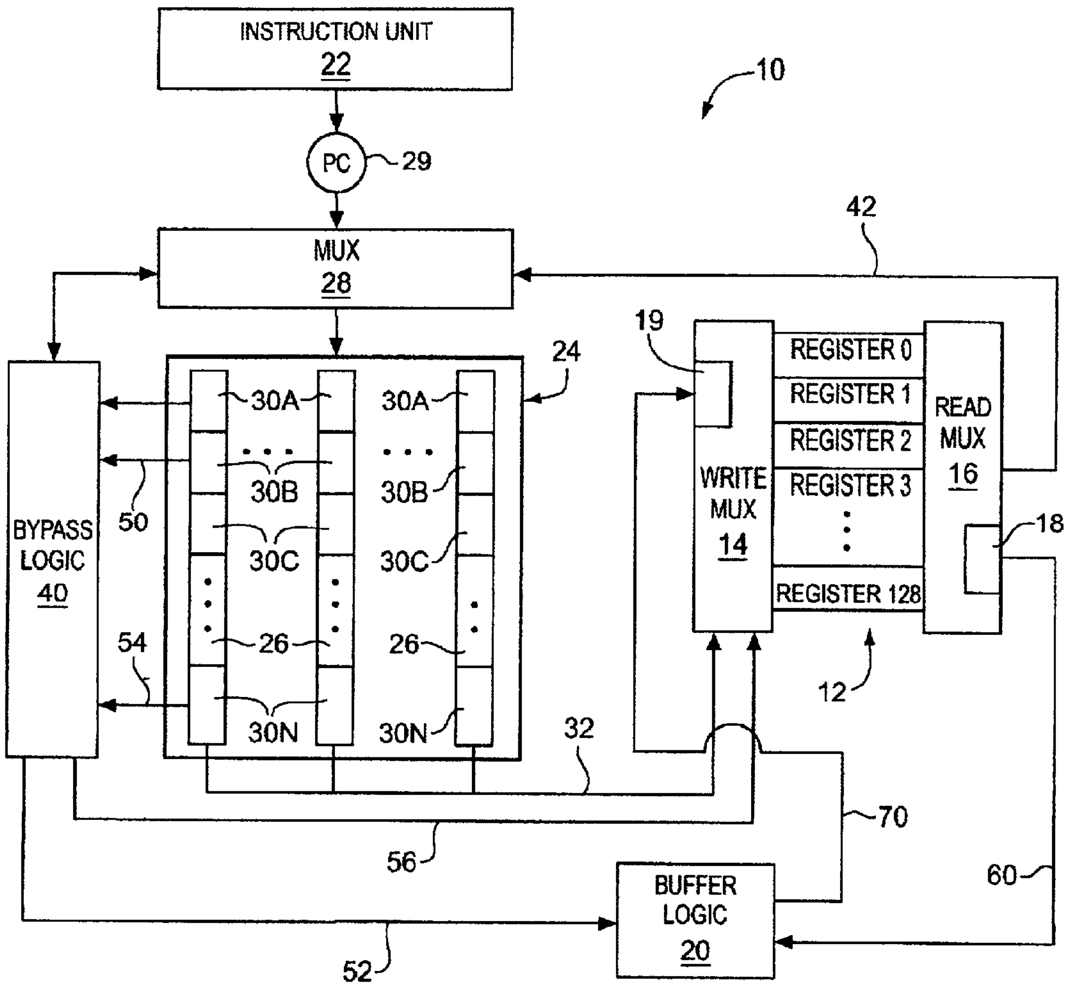
FIG. 1 schematically shows a register file checkpointing architecture of the invention.

FIG. 1 shows a register file checkpointing architecture 10 suitable for use with the invention. Architecture 10 may for example function as a high performing RISC processor utilizing a register file 12 with 128 64-bit registers. Register file 12 has multiple write ports processed through a write mux 14, and multiple read ports processed through a read mux 16. One read port 18 to register file 12 may be used to access and read data from register file 12 for temporary storage within buffer 20, as described herein. One write port 19 may be used to write the temporary data from buffer 20 to register file 12 when data errors are detected and to re-execute a program.

In operation, an instruction unit 22 provides instructions to an execution unit 24 with an array of pipeline execution units 26 through a mux 28. A program counter 29 serves to sequentially step through the program threads of the program initiating those instructions. Pipeline execution units 26 have execution stages 30*a*–30*n* so as to perform, for example, fetch (F), decode (D), execute (E) and write-back (W) operations known to those skilled in the art. Pipeline stage 30n may for example architect any of the registers within register file 12 as a write-back stage W, through data bus 32 and write mux 14 (supporting the multiple write ports). Individual stages 30 of pipelines 26 may transfer speculative data to other execution units, and/or to register file 12, through bypass logic 40; this speculative data may reduce hazards within other individual stages 30 in providing the data forwarding capability for architecture 10; this speculative data also serves to enhance processor performance by writing speculative data to register file 12 as predictive of final architected loads to registers therein. Data may be read from register file 12 through read mux 16 (supporting the multiple read ports) and data bus 42.

Prior to architecting data to a register within register file 12, the prior data of that register is written to buffer 20. Preferably, this read is performed at the same time instruction operands are read for an instruction in a pipeline 26, which is just prior to the execute E stage of that pipeline 26. For example, if stage 30*c* represents the execute stage, and stage 30*b* represents the decode D stage, then speculative data representing a future architected store may be transferred from stage 30*b*—and through bus 50, logic 40, and bus 56—to a register of register file 12. The prior data of that register is read prior to the storing of that speculative load, so it is saved in backup. Generally, data is read from read port 18 of register file 12 and stored in buffer 20 through bus 60. However, other data paths between register file 12 and buffer 20 may be used as a matter of design choice, such as through bus 42, mux 28, bypass logic 40 and bus 52, as shown.

In summary, prior data of a particular register is stored within buffer 20 prior to a register load of that register within register file 12. The prior data within that register is read and stored in buffer 20, via read port 18 and bus 60, just prior to architecting the new data within the register of register file 12, e.g., at a write-back stage through bus 32.

At every checkpoint, defined in more detail below, architecture 10 is evaluated for data errors. The architecting of data after a speculative load may be preferentially delayed during the check for data errors. If no data errors are detected since the last checkpoint, buffer 20 is flushed and processing of instructions from unit 22 continue; a delayed speculative load may also be architected. If data errors are detected, then register file 12 is reloaded with data from buffer 20, through buffer write bus 70 and write port 19 (or another write port of processed through write mux 14), and counter 29 is reset to re-execute instructions corresponding to the last checkpoint; processing thereafter continues to the next checkpoint.

Figure 2:
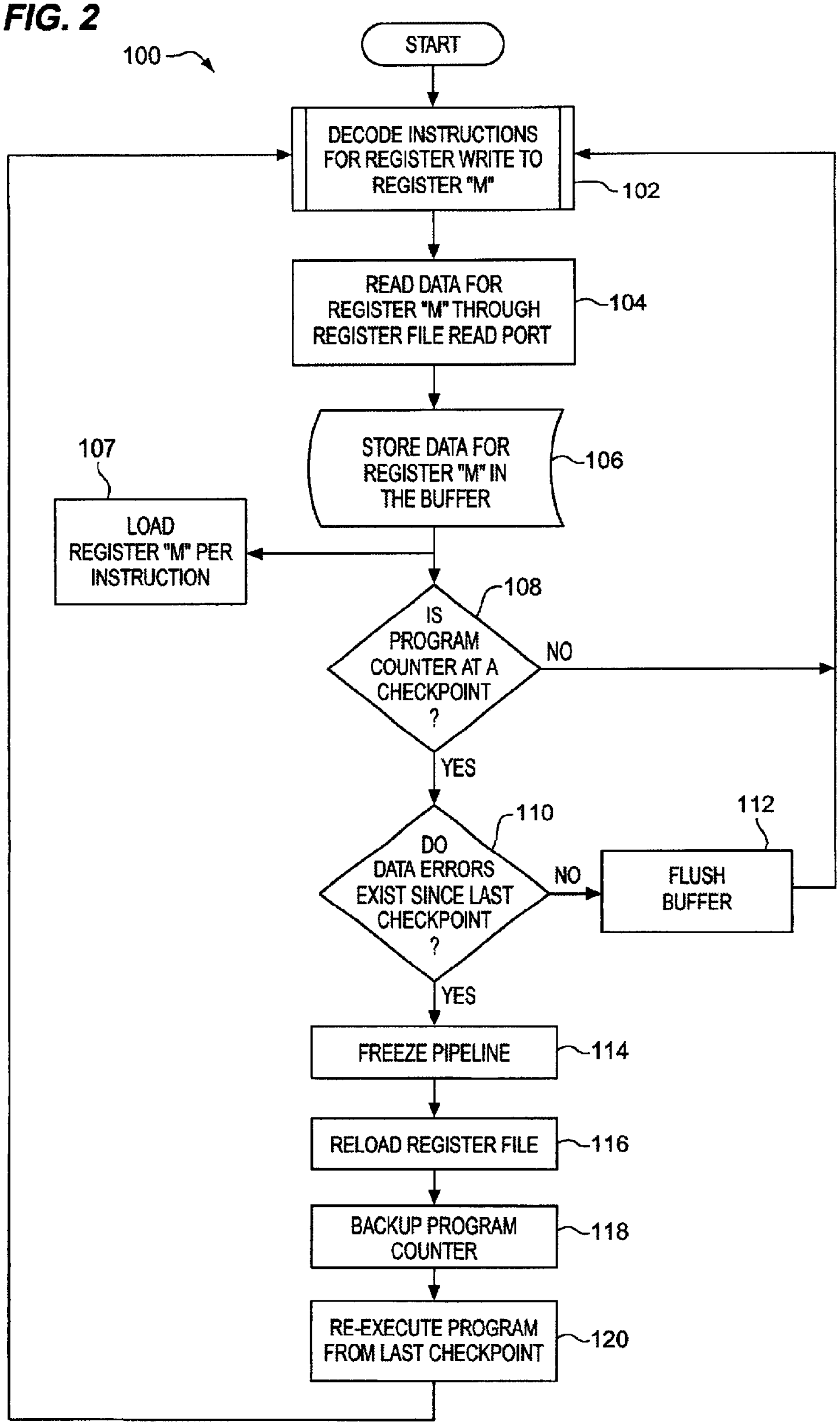
FIG. 2 illustrates register file checkpointing in a flowchart in accord with the invention.

Checkpointing of register file 12 occurs in the following way, as illustrated by the flowchart 100 of FIG. 2. At step 102, an instruction is decoded for a register write (i.e., a "load") of data to a register (illustratively identified as register "M") within the register file. Prior to writing that data, pre-existing data within register "M" is read from the register file, at step 104, and then stored in the buffer, at step 106. Register "M" may be loaded, as directed from the decoded instruction, at step 107 (step 107 may occur at other locations within flowchart 100).

Figure 3:
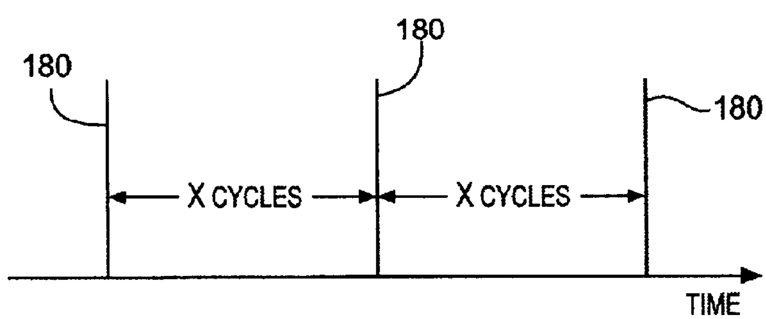
FIG. 3 illustrates checkpoint timing in accord with the invention.

If the current cycle does not correspond to a checkpoint, as defined at step 108, then processing of subsequent instruction decodes again proceeds at step 102. As illustrated in FIG. 3, checkpointing occurs at sequential time periods, identified as checkpoints 180 separated by "X" cycles. If the current cycle does correspond to a checkpoint, then architecture 10 is evaluated for data errors, at step 110. If no errors exist, the buffer is flushed, at step 112, so that new data may be stored within the buffer and for a period extending to the next checkpoint; processing thereafter proceeds at step 102, as shown. If errors do exist, the pipelines are frozen, at step 114, and the register file is reloaded with data within the buffer up to the last checkpoint, at step 116. The program counter is reset to correspond to the last checkpoint, at step 118, and the program is re-executed at step 120 to overcome the data errors within the time lapse between the current and last checkpoint. Processing continues after step 120 to step 102, as shown.

Those skilled in the art should appreciate that buffer logic 20 may take the form of a register file. Typically, that register file has many fewer registers than register file 12, since buffering only occurs between checkpoints.

The invention thus attains the features set forth above, among those apparent from the preceding description. Since certain changes may be made in the above methods and systems without departing from the scope of the invention, it is intended that all matter contained in the above description or shown in the accompanying drawing be interpreted as illustrative and not in a limiting sense. It is also to be understood that the following claims are to cover all generic and specific features of the invention described herein, and all statements of the scope of the invention which, as a matter of language, might be said to fall there between.

What is claimed is:

1. A method for recovering from data errors within a processor, comprising the steps of:

for each cycle of the processor, storing a copy of data from at least one, but not all, registers of a register file within a buffer if new data architected to the registers and if the cycle is not a checkpoint cycle;

checking for data errors within the processor if the cycle is a checkpoint cycle; and restoring the data from the buffer to the register file in the event of data errors.

2. A method of claim 1, further comprising loading the new data to the registers after the step of storing.

3. A method of claim 1, further comprising loading the new data to the registers concurrently with the step of storing.

4. A method of claim 1, the step of storing the data within the buffer comprising storing the data within a second register file.

5. A method of claim 1, further comprising the step of flushing the buffer after checking for, and detecting no, data errors.

6. A method of claim 1, further comprising the step of freezing execution of instructions within pipelines of the processor after detecting data errors.

7. A method of claim 1, further comprising the step of resetting a program counter of the processor after detecting errors.

8. A method of claim 7, further comprising a step of re-executing a program through the processor at a time associated with the reset program counter.

9. A method of claim 1, the step of checking for data errors comprising periodically checking for the data errors at sequential time periods defined by a number of processor clock cycles.

10. A method of claim 1, further comprising the steps of utilizing an error correction code in connection with data storage to the buffer.

11. A method of claim 1, the step of checking comprising checking for data errors within the processor each plurality of cycles.

12. A processor with register file data recovery, comprising:

an execution unit having a plurality of pipelines for processing program instructions relative to a program counter;

a register file, wherein one or more stages of the pipelines loads new data to one or more registers of the register file; and a buffer for storing a copy of data within at least one, but not all, registers prior to loading the new data, and for restoring data to the register file in the event data errors are detected at a checkpoint within the processor;

wherein the buffer is flushed at the checkpoint if no data errors are detected and wherein the checkpoint occurs each plurality of processor cycles.

13. A processor of claim 12, the buffer comprising a second register file.

14. A processor of claim 12, the register file comprising an extra read port for reading the data from the register.

15. A processor of claim 12, the register file comprising a write port for writing the data from the buffer to the register.

16. A processor of claim 12, further comprising one or more error detectors for detecting the data errors.

17. A processor of claim 16, the error detectors comprising redundant logic devices.

18. A processor of claim 12, further comprising error correction code for data recovery of data stored within the buffer.

19. A processor of claim 12, the buffer reading data within the registers prior to an execution stage for an instruction identifying a write to the registers.

20. A processor of claim 12, the program counter being reset in connection with the buffer restoring data to the register file.

* * * * *

UNITED STATES PATENT AND TRADEMARK OFFICE

CERTIFICATE OF CORRECTION

PATENT NO. : 6,941,489 B2
APPLICATION NO. : 10/084533
DATED : September 6, 2005
INVENTOR(S) : Eric DeLano It is certified that error appears in the above-identified patent and that said Letters Patent is hereby corrected as shown below:

In column 2, line 16, delete “b ass” and insert -- bypass --, therefor.

In column 2, line 17, delete “norm” and insert -- normal --, therefor.

In column 2, line 22, delete “d” and insert -- and --, therefor.

In column 2, line 24, delete “t” and insert -- to --, therefor.

In column 4, line 48, in Claim 1, after “data” insert -- is --.

Signed and Sealed this

Eleventh Day of August, 2009

David J. Kappos

David J. Kappos
*Director of the United States Patent and Trademark Office*